United States Patent
Audigie

(10) Patent No.: US 9,066,466 B2
(45) Date of Patent: Jun. 30, 2015

(54) REMOTE SUPPLY DEVICE FOR A SINGLE SEEDER AND SINGLE SEEDER USING SUCH A SUPPLY DEVICE

(75) Inventor: Jean-Charles Audigie, Bouxwiller (FR)

(73) Assignee: KUHN S.A., Saverne (FR)

( * ) Notice: Subject to any disclaimer, the term of this patent is extended or adjusted under 35 U.S.C. 154(b) by 0 days.

(21) Appl. No.: 14/111,403

(22) PCT Filed: Apr. 4, 2012

(86) PCT No.: PCT/FR2012/050729
§ 371 (c)(1),
(2), (4) Date: Oct. 11, 2013

(87) PCT Pub. No.: WO2012/140349
PCT Pub. Date: Oct. 18, 2012

(65) Prior Publication Data
US 2014/0020609 A1    Jan. 23, 2014

(30) Foreign Application Priority Data
Apr. 11, 2011 (FR) ..................... 11 53130

(51) Int. Cl.
*A01C 7/04* (2006.01)
*A01C 7/10* (2006.01)
*A01C 7/20* (2006.01)
*A01C 7/08* (2006.01)

(52) U.S. Cl.
CPC . *A01C 7/20* (2013.01); *A01C 7/081* (2013.01); *A01C 7/102* (2013.01); *A01C 7/046* (2013.01)

(58) Field of Classification Search
CPC ............ A01C 7/00; A01C 7/20; A01C 7/046; A01C 7/044; A01C 7/042; A01C 7/04; A01C 7/08; A01C 7/10; A01C 7/102; A01C 7/081
USPC ............. 111/174, 170, 177, 77, 925; 221/211
See application file for complete search history.

(56) References Cited

U.S. PATENT DOCUMENTS 6,935,256 B1    8/2005    Meyer

FOREIGN PATENT DOCUMENTS

| EP | 1 886 548 | 2/2008 |
|---|---|---|
| FR | 2 315 834 | 1/1977 |
| GB | 2 302 075 | 1/1997 |
| GB | 2 307 680 | 6/1997 |

OTHER PUBLICATIONS

International Search Report Issued Jul. 6, 2012 in PCT/FR12/050729 Filed Apr. 4, 2012.

*Primary Examiner* — Christopher J Novosad
(74) *Attorney, Agent, or Firm* — Oblon, McClelland, Maier & Neustadt, L.L.P.

(57) ABSTRACT

A supply device for a single seeder via a flow of air from a main reservoir containing product to at least one auxiliary reservoir depending on its filling rate, each auxiliary reservoir being connected to the main reservoir by a respective leak-tight duct, the number of auxiliary reservoirs corresponding to the number of distributors of the single seeder. A regulating system is associated with each auxiliary reservoir and the regulating system has a sensor for detecting the level of product and a valve for regulating the flow of air in the corresponding auxiliary reservoir. A single seeder using a supply device according to the invention.

11 Claims, 4 Drawing Sheets

Figure 1:
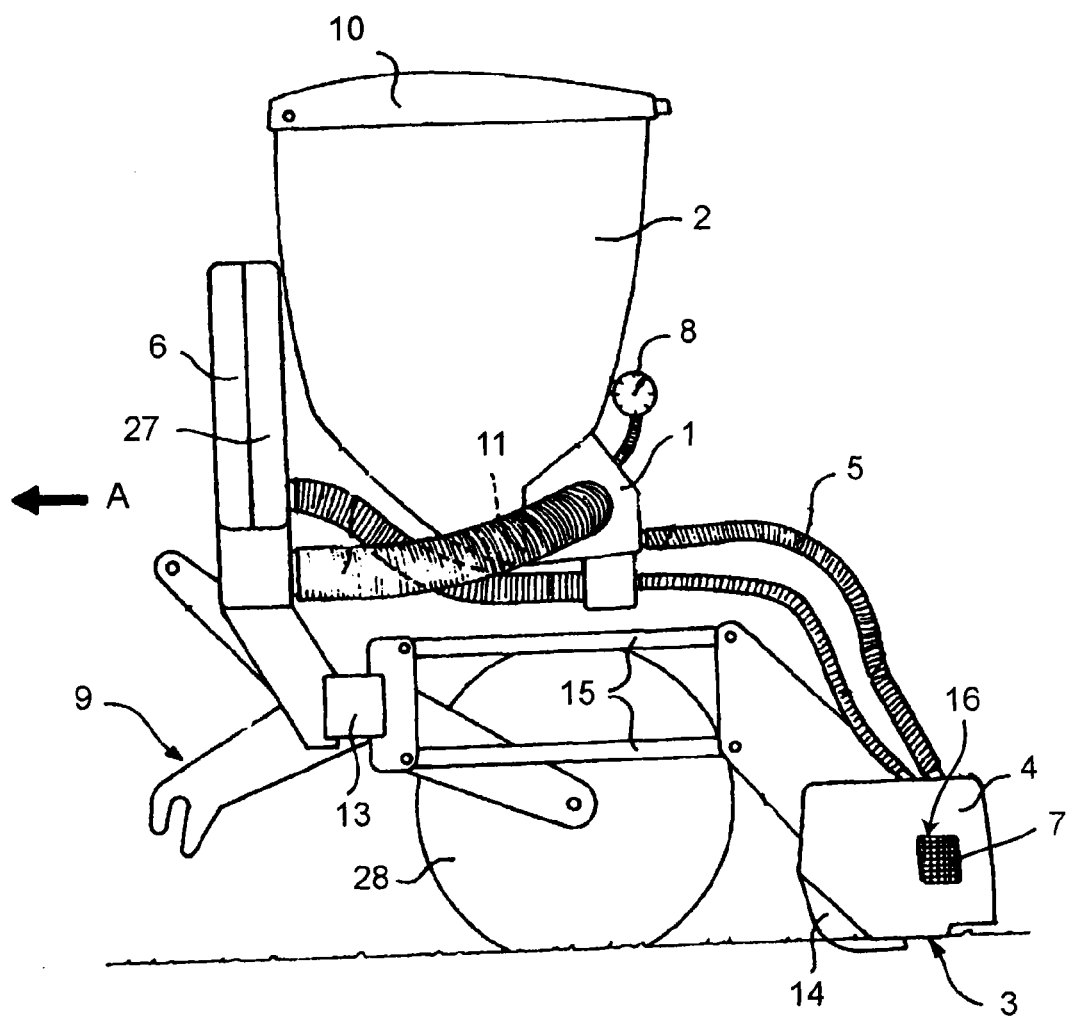

REMOTE SUPPLY DEVICE FOR A SINGLE SEEDER AND SINGLE SEEDER USING SUCH A SUPPLY DEVICE

The present invention relates to the general technical field of agricultural machinery. The invention concerns a supply device for a single seeder via a flow of air from a main reservoir containing product to at least one auxiliary reservoir depending on its filling rate, each auxiliary reservoir being connected to the main reservoir by a respective leak-tight duct, the number of auxiliary reservoirs corresponding to the number of distributors of the single seeder. The invention applies to a remote supply device for a distributing machine such as a single seeder with pneumatic distribution.

Such a supply device is presented in the application FR 2 315 834. This supply device makes it possible to convey product, such as seeds, from a main reservoir to at least one auxiliary reservoir. The conveying of the product is carried out via a flow of air through a leak-tight duct depending on the filling state of the auxiliary reservoir. The auxiliary reservoir has an air exhaust device arranged on one of its side walls. The air exhaust device creates a loss of charge which decreases as a function of the filling of the auxiliary reservoir. When the auxiliary reservoir is filled, the loss of charge is zero and the conveying of seeds from the main reservoir is stopped. Each auxiliary reservoir is therefore supplied individually and automatically with seeds depending on its filling rate. Such a supply device is used in particular for a precision seed drill with a remote distribution of the seeder elements. The functioning of the supply of the auxiliary reservoir via the escape of air is dependent on the type of product to be conveyed and in particular on the shape of the product allowing the air exhaust device to be blocked.

In the case of seed drills comprising a large number of seeder elements, some auxiliary reservoirs are more distant from the main reservoir than others. Thus, the flow of air must be increased so that the seeds are conveyed up to the distant auxiliary reservoirs, arranged at the ends of the frame. The heightwise position of the main reservoir and in particular the height of the bottom of the main reservoir has an influence on the conveying of seeds by the flow of air. On another hand, this flow of air increase brings about a surplus of seeds in the auxiliary reservoirs close to the main reservoir, which causes an overflow of the level of seeds. On another hand, the great flow of air can also cause the loss of precision in placement of the seeds in the seeding rows. In order that the remote supply of the auxiliary reservoirs is approximately correct for each, the number of auxiliary reservoirs must be limited. In order that the flow of air which takes up the seeds is more or less suited to each auxiliary reservoir and whilst having a greater number of auxiliary reservoirs, two flows of air would have to be used: the one suited to the auxiliary reservoirs close to the main reservoir, and the other suited to the distant auxiliary reservoirs. Such an adaptation makes it possible to avoid damage on account of too high a flow of air for the auxiliary reservoirs of the centre, but also involves additional costs.

The present invention has the aim of overcoming the above-mentioned drawbacks. It is to propose in particular an efficient supply device for each auxiliary reservoir, independently of the number of auxiliary reservoirs, its position with respect to the main reservoir and whatever the product is which is to be conveyed.

To this end, an important feature of the invention consists in that a regulating system is associated with each auxiliary reservoir and that the regulating system has a sensor for detecting the level of product and a valve for regulating the flow of air in the corresponding auxiliary reservoir. This regulating system thus allows a correct functioning to be guaranteed for each auxiliary reservoir, whatever its position with respect to the main reservoir. Thus, the number of auxiliary reservoirs is no longer limited. By controlling the filling level of the auxiliary reservoir, the interruption of the supply with product is no longer dependent on the ability of the product to block the air exhaust device.

Figure 2:
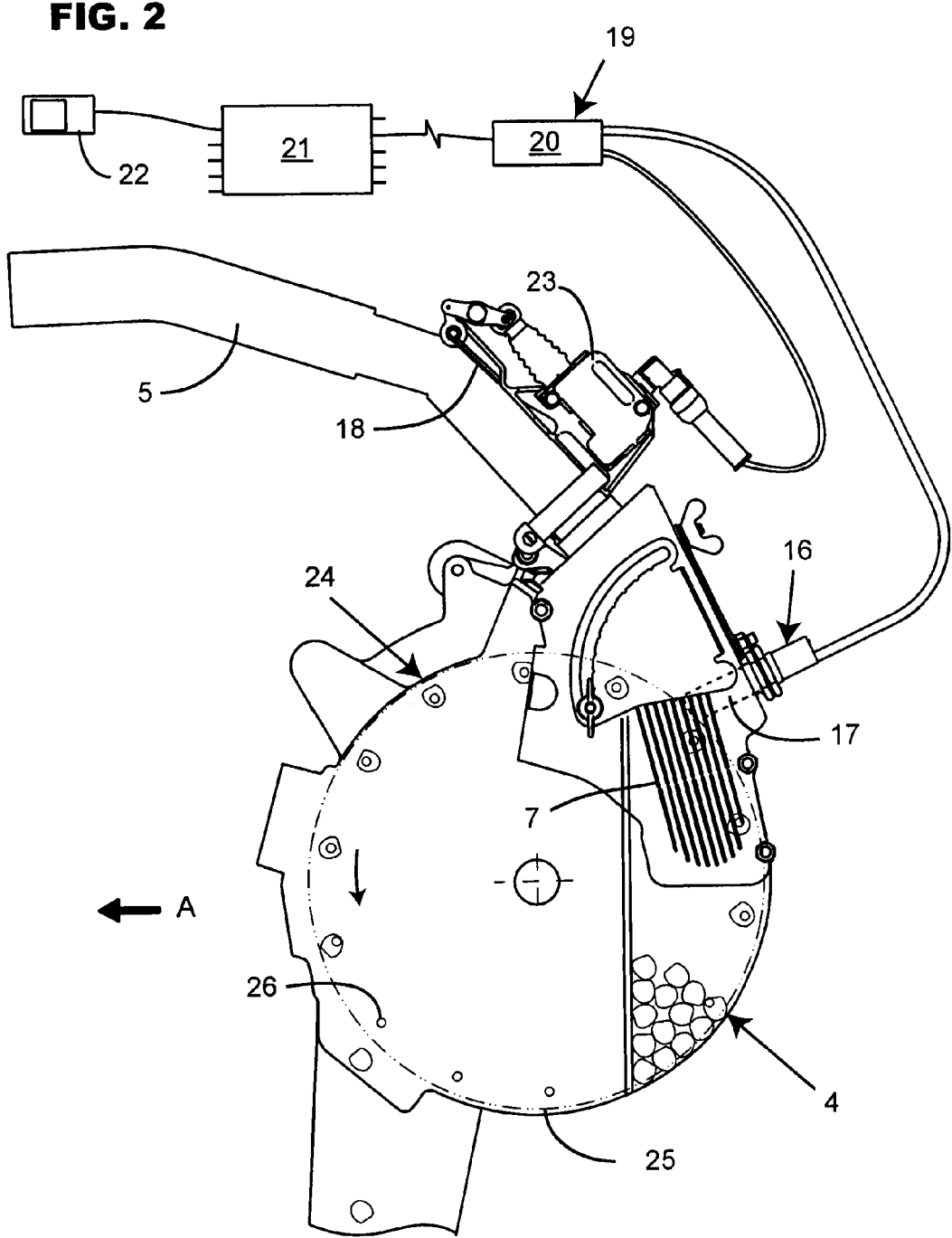
Figure 3:
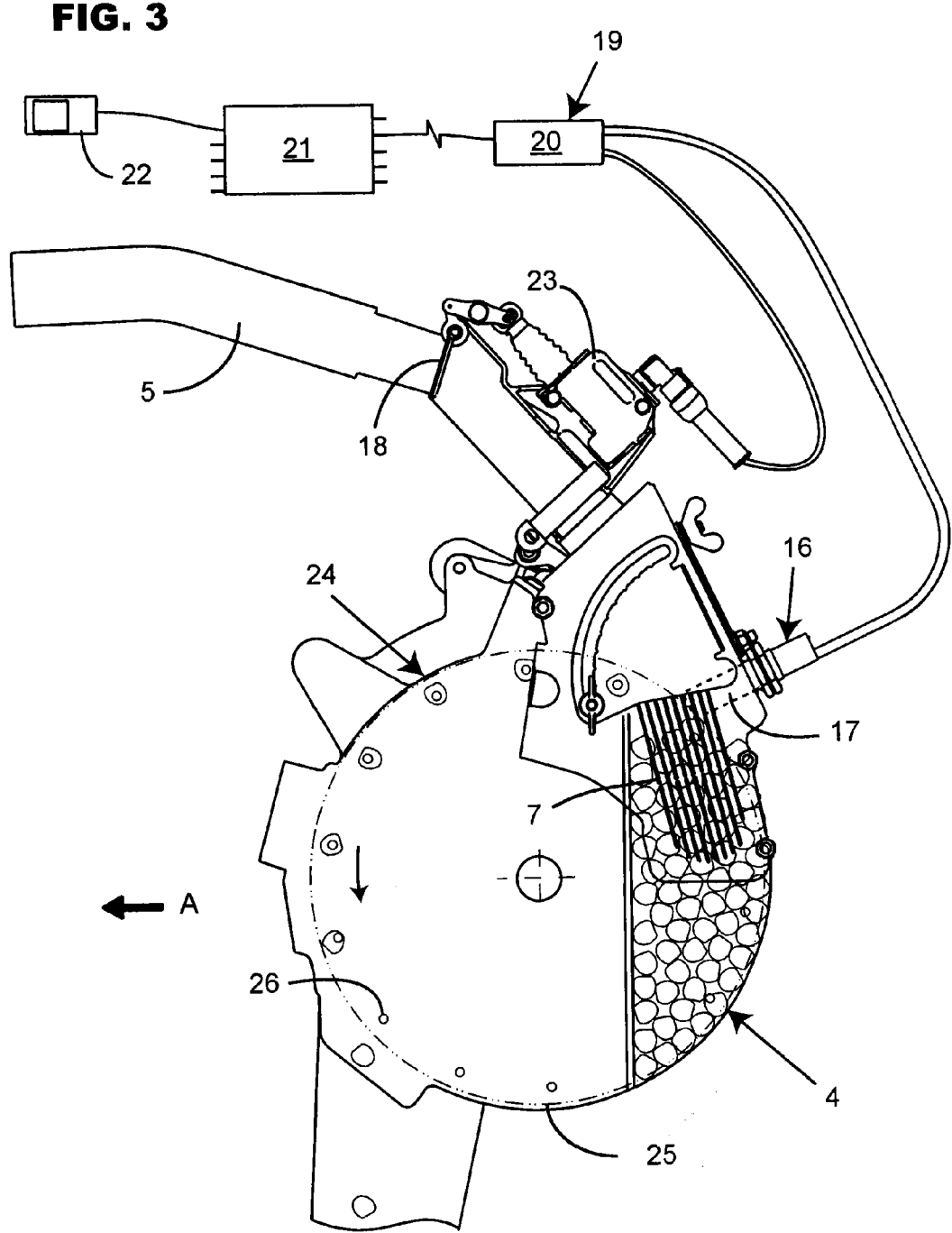
Figure 4:
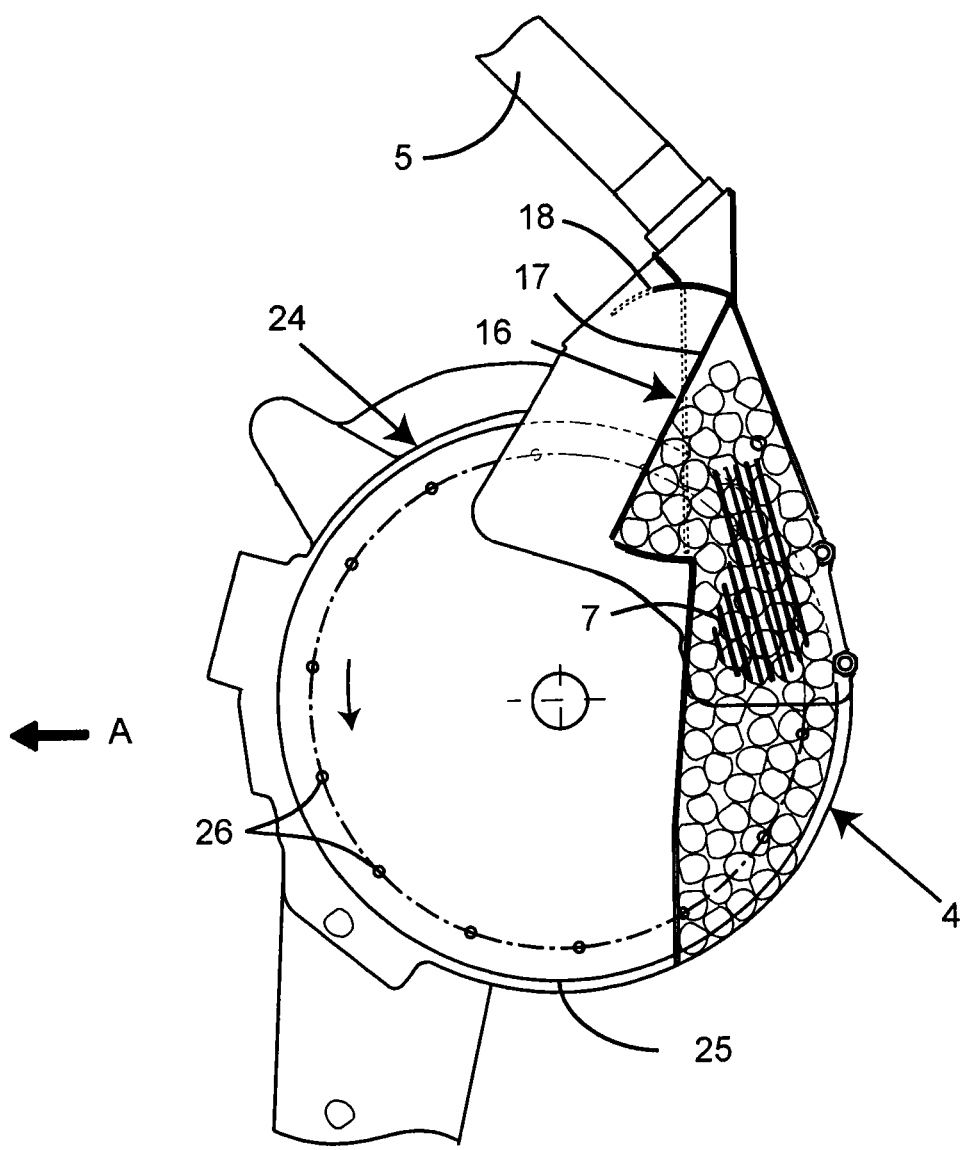

Other features and advantages of the invention will emerge from the following description with regard to the attached drawings which are only given by way of non-restrictive examples of the invention. In these drawings:

FIG. 1 shows, viewed from the side, a distributing machine provided with a supply device according to the present invention, FIG. 2 represents an auxiliary reservoir, the predetermined level of product of which is not reached, FIG. 3 represents an auxiliary reservoir, the predetermined level of product of which is reached, FIG. 4 represents an auxiliary reservoir with a mechanical regulating device.

FIG. 1 is a side view of a distributing agricultural machine provided with a supply device (1) according to the invention. The machine has a main reservoir (2) intended to contain product and at least one distributor (3) to which an auxiliary reservoir (4) is associated. The supply device (1) allows a remote supply of the auxiliary reservoirs (4) from the main reservoir (2). The product supply is done by a flow of air. The flow of air conveys the product from the main reservoir (2) to the auxiliary reservoirs (4). The supply is carried out in an individual manner and depending on the filling rate of the auxiliary reservoir (4), each auxiliary reservoir (4) being connected to the main reservoir (2) by a respective leak-tight duct (5). The flow of air for conveying the product is provided by a fan (6). The flow of air at the inlet of the fan (6) is adjustable. The outlet of air from the fan (6) is adjustable by an air exhaust device (7) arranged close to the auxiliary reservoir (4). The air exhaust device (7) is an escape. The air exhaust device (7) is carried out in the form of openings arranged in the auxiliary reservoir (4). The size of these openings is such that the product which is to be conveyed cannot escape through the openings. The fan (6) provides a flow of air in the form of compressed air which extracts the product from the main reservoir (2) to cause it to arrive at the auxiliary reservoirs (4) through the respective leak-tight duct (5). The accumulation of product in the auxiliary reservoir (4) causes a loss of charge which sufficiently slows down the flow of air in the leak-tight duct (5) to prevent the conveying of the product. The supply of the auxiliary reservoir (4) is thus interrupted, when it is full. When the auxiliary reservoir (4) has emptied, there is no longer an accumulation of product in front of the air exhaust device (7), the loss of charge reduces and the conveying of product resumes. The supply device (1) therefore permits a self-regulated supply depending on the filling rate of the auxiliary reservoir (4). The pneumatic supply device is provided with a manometer (8).

The machine represented in FIG. 1 has a coupling frame (9) allowing connection to a tractor (not represented). The tractor moves the machine in a direction of advance indicated by the arrow (A). In the rest of the description, the following terms "front", "rear" and "in front", "behind" are defined with respect to the direction of advance (A). Alternatively, the machine has a coupling frame which is integrated to an intermediate soil-working tool on which distributors (3) are hitched. The main reservoir (2) is provided with a cover (10) and an outlet (11) arranged laterally at the bottom. The cover (10) allows a tight closure of the main reservoir (2). The duct (5) connecting an auxiliary reservoir (4) to the main reservoir (2) is flexible. The cross-section of the duct (5) is circular.

Such a distributing machine is, for example, a seed drill (12), which has pneumatic distribution. It then is a precision or single seeder. The product conveyed by the flow of air is then seeds. Such a seed drill (12) distributes the seeds one by one on the seedbed line with constant spacing. The seed drill (12) comprises a chassis (13) on which seed distributors (3) are distributed in a regular manner. These distributors (3) are sowing elements. Each distributor (3) has an auxiliary reservoir (4) and a planting element (14). The distributor number corresponds to the number of seed rows of the single seeder. Each distributor (3) is mounted on the chassis (13) by means of a deformable parallelogram (15) which enables it to move parallel to the ground. The planting element (14) is achieved by a share making it possible to plant the seeds in the earth. In an alternative, the distributor (3) has two planting elements (14). The seed row is then doubled.

According to an important feature of the invention, a regulating system (16) is associated with each auxiliary reservoir (4) and the regulating system (16) has a sensor (17) for detecting the level of product and a valve (18) for regulating the flow of air in the corresponding auxiliary reservoir (4). The regulating system (16) is represented in simplified form in FIG. 1. Owing to the regulating system (16), there is no longer an overflowing of product in the auxiliary reservoir (4) since the valve (18) is closed when the sensor (17) detects the predetermined filling level, the closure of the valve causing the interruption of the conveying of product towards the auxiliary reservoir (4). With this regulating system (16), a correct functioning of the supply of the auxiliary reservoir (4) is guaranteed and this being whatever its position, close or distant with respect to the main reservoir (2). The conveying of the seeds to these different auxiliary reservoirs (4) is carried out through a single flow of air. The number of auxiliary reservoirs (4) and consequently the number of distributors (3) is therefore no longer limited. This supply device (1) will be able to supply a large number of auxiliary reservoirs (4). By way of example, the single seeder, owing to the supply device (1) according to the invention, will be able to supply at least twenty auxiliary reservoirs (4), whatever their position on the chassis (13). Such a chassis is therefore preferably foldable, to respect the overall dimension for transport during movements on the roads.

The interruption of supply is no longer dependent on the shape of the product and on its ability to block the air exhaust device (7). A regulating system (16) according to the invention is arranged on each auxiliary reservoir (4). In this way, the supply device (1) of the main reservoir (2) to the auxiliary reservoirs (4) is controlled and regulated. The regulating systems (16) are independent from one another. The auxiliary reservoirs (4) arranged at the centre, close to the main reservoir (2), are thus protected from a possible overflowing of level, and the precision of sowing is kept. The flow of air for the supply of the auxiliary reservoirs (4) close to or more distant from the main reservoir (2) is sufficient for a correct functioning. The number of auxiliary reservoirs (4) to be supplied by a main reservoir (2) is not limited by the flow of air. This regulating device (16) is adapted for the distribution of any product. Whether they are heavy or light seeds, the supply of the auxiliary reservoirs (4) is optimal.

FIG. 2 represents an auxiliary reservoir (4) with the duct (5) allowing the product supply. The product supply is carried out in the upper part of the auxiliary reservoir (4). The regulating system (16) extends between the main reservoir (2) and the corresponding auxiliary reservoir (4). The regulating system (16) of FIGS. 2 and 3 has in addition a control element (19). This control element (19) is intended to receive information from the sensor (17) and to control the valve (18) as a result. The sensor (17) communicates information with regard to the filling level of the auxiliary reservoir (4). This is an electronic regulating system (16). The sensor (17) extends over the auxiliary reservoir (4), whilst the valve (18) extends in the duct (5) connecting the auxiliary reservoir (4) to the main reservoir (2). The valve (18) has a shape complementary to the duct (5). For a better pivoting of the valve (18) in the duct (5), the latter has a module of rectangular cross-section. The articulation axis is substantially transverse to the direction of the duct (5). In an alternative, the module inserted in the duct (5) has a cross-section in the form of a semicircle, the rounded part being directed towards the bottom. The valve (18) has a complementary shape and the base of the semicircle is the articulation axis. In a preferred manner and as represented in FIG. 2, the valve (18) is arranged closer to the auxiliary reservoir (4) than to the main reservoir (2). According to an alternative, the valve (18) is arranged close to the main reservoir (2) and in particular close to the outlet (11) arranged in the bottom of the main reservoir (2).

The valve (18) is driven with regard to the level of product detected in the corresponding auxiliary reservoir (4) by the sensor (17). Advantageously, the sensor (17) detects a filling level of the auxiliary reservoir (4). When it detects the predetermined level, it delivers a signal which makes it possible to drive the valve (18) which is present in the supply duct (5) of the auxiliary reservoir (4) so as to carry out a regulation. The sensor (17) is a proximity detector. The sensor (17) makes it possible to control the filling of the auxiliary reservoir (4) without physical contact with the product, for example the seeds. For another type of sensor, the end of the sensor must be in contact with the product to be able to detect a level. Thus, the position of the sensor (17) on the auxiliary reservoir (4) is adjusted with regard to the filling level to be detected. Its position also depends on the type of sensor which is used.

Advantageously and for the good functioning of the supply device (1), the valve (18) is mounted in a mobile manner in the respective duct (5). The valve (18) is brought to extend according to two positions. In one position, the valve (18) allows the passage of the flow of air in the duct (5), whereas in the other position, the valve (18) prevents the passage of the air and therefore interrupts the conveying of product to the corresponding auxiliary reservoir (4). The mounting of the valve (18) on the duct (5) is carried out by means of an articulation. The valve (18) is open when the predetermined level of product in the corresponding auxiliary reservoir (4) is not detected by the sensor (17). The articulation is positioned such that the valve (18) is not an obstacle in the duct (5) for the product conveyed by the flow of air when it is open. This position is represented in FIG. 2. The other position of the valve (18) is illustrated in FIG. 3. In this position, the valve (18) is closed, since the sensor (17) has detected the predetermined level of product. The filling level to be detected can vary depending on the type of product, the position and the sensitivity of the sensor (17). For a better understanding, the seeds have been represented in FIGS. 2 to 4.

With the regulating system (16) being electronic, the control element (19) includes an electronic box (20) connected to a connection box (21) through a signal connector. The information taken by means of the sensor (17) is sent to the electronic box (20), the latter being capable of interpreting them. The electronic box (20), according to the information received from the sensor (17), drives the valve (18). The position information of the valve (18) can also be transmitted to the user via an electronic console provided with a display (22) arranged in the driver's cab. When the sensor (17) has detected the predetermined filling level, the electronic box (20) controls an actuator (23) for closing the valve (18). In the example which is represented, this is an electric actuator associated with a wheel and worm device. It transforms the rotation movement of the motor into a translation movement of the screw. A variant actuator would be the use of an electric jack.

FIG. 4 represents another example embodiment of a regulating system (16); it is a mechanical regulating system. FIG. 4 shows an auxiliary reservoir with a regulating system which makes it possible to detect the seeds and to close a valve when the predetermined level is reached. This regulating system (16) has a sensor (17) achieved in the form of a wall which moves with regard to the pressure of the seeds exerted against the wall. The wall is articulated so as to be able to pivot. The articulation is arranged so as not to hinder the supply of the seeds. It extends in the auxiliary reservoir (4). The valve (18) extends in the upper part of the vertical wall. Advantageously, the valve (18) is combined to the sensor (17), i.e. the orientation of the wall gives the position of the valve (18). The representation in continuous lines corresponds to a closed position of the valve (18), the flow of air and the seeds supplying the auxiliary reservoir are interrupted. The seeds are represented by way of indication and the wall is situated in an inclined position under the pressure of the seeds, which has brought about the closure of the valve (18). The other position is represented in broken lines. The wall then extends substantially vertically and the valve is open to enable the flow of air and the seeds to supply the auxiliary reservoir (4).

In the light of FIGS. 2 to 4, it is noted that a distribution (24) is associated with the auxiliary reservoir (4). The distribution (24), represented in FIGS. 2 and 3, has the role of extracting the seeds one by one from the auxiliary reservoir (4) and distributing them at constant intervals on the row via the planting element (14). The extraction of the seeds is achieved by means of a perforated disc (25). The perforations (26) are distributed at regular intervals over a circumference close to the periphery of the disc (25). The distribution (24) comprises a casing of general cylindrical shape in which the disc (25) is mounted. The disc (25) is driven in rotation to allow the selection of seeds assisted by a flow of air under negative pressure. The flow of air for the selection of the seeds is produced by a turbine (27) driven by the power take-off of the tractor. The disc (25) is driven in rotation via driving elements with regard to the advancing speed of the seed drill. Thus, the distribution speed is adapted to the advancing speed of the seed drill (12), which makes it possible to sow the seeds with constant spacing. The advancing speed of the seed drill is given by a wheel (28). The wheel (28) is mounted on the chassis (13). The seeds are then guided towards the planting element (14) which creates a furrow of a defined depth to place the seed therein and to cover it with earth. By adapting the disc (25) and in particular the perforations to the size and weight of the seeds, the distribution (24) can sow a large number of species.

According to a variant which is not represented, the distribution is a volumetric dispenser with grooves or lugs. Such a dispenser is adapted to sowing cereals (wheat, barley) or for fertilizer.

The invention applies to the field of seed drills, precision distributor. The invention concerns a pneumatic single seeder equipped with a supply device according to the invention. The machine represented in FIG. 1 is a seed drill intended to be carried by the three-point hitch of the tractor. The invention also concerns a machine which is drawn by the tractor.

It is readily evident that the invention is not limited to the embodiments described above and represented in the attached drawings. Modifications remain possible, in particular with regard to the constitution or the number of the various elements or by substitution of technical equivalents without, however, departing from the scope of protection as defined by the following claims.

The invention claimed is:

1. A supply device for a single seeder, comprising:
a main reservoir containing product;
a plurality of distributors of the single seeder;
a plurality of auxiliary reservoirs each auxiliary reservoir being connected to the main reservoir by a respective duct, a number of auxiliary reservoirs corresponding to a number of distributors of the single seeder; and
a plurality of regulating systems, a number of regulating systems corresponding to the number of auxiliary reservoirs such that a regulating system is associated with each auxiliary reservoir,
wherein each of the regulating systems has a sensor for detecting a level of product and a valve for regulating a flow of air from the main reservoir to the corresponding auxiliary reservoir depending on a filling rate of the auxiliary reservoir.

2. A supply device according to claim 1, wherein the regulating system extends between the main reservoir and the corresponding auxiliary reservoir.

3. A supply device according to claim 1, wherein the valve is driven with regard to the level of product detected in the corresponding auxiliary reservoir by the sensor.

4. A supply device according to claim 1, wherein the valve is mobile in the respective duct and is brought to extend according to two positions.

5. A supply device according to claim 1, wherein the valve is closed when the sensor detects a predetermined level of product in the corresponding auxiliary reservoir.

6. A supply device according to claim 1, wherein the valve is open when a predetermined level of product in the corresponding auxiliary reservoir is not detected by the sensor.

7. A supply device according to claim 1, wherein a planting element is associated with each auxiliary reservoir.

8. A supply device according to claim 1, wherein the regulating system is an electronic system and has, in addition, a control element.

9. A supply device according to claim 8, wherein the sensor extends over the auxiliary reservoir and that the valve extends in the corresponding duct connecting the corresponding auxiliary reservoir to the main reservoir.

10. A supply device according to claim 9 wherein the valve extends in the corresponding duct connecting the corresponding auxiliary reservoir to the main reservoir at a position closer to the auxiliary reservoir than to the main reservoir.

11. A single seeder having a chassis, seed distributors providing with a planting element and a supply device according to claim 1.

* * * * *